350-96.27 SR

XR 3,784,741

United Stat[es Patent]

Minami et al.

[11] 3,784,741

[45] Jan. 8, 1974

[54] CATHODE RAY TUBE DEVICE

[75] Inventors: Hiroshi Minami; Masao Ando, both of Yokohama; Yoshiharu Obata, Tokyo, all of Japan

[73] Assignee: Tokyo Shibaura Electric Co., Ltd., Kawasaki-shi, Japan

[22] Filed: July 19, 1971

[21] Appl. No.: 165,420

[30] Foreign Application Priority Data

July 24, 1970 Japan ............................... 45/73478
July 24, 1970 Japan ............................... 45/73479

[52] U.S. Cl. ............ 178/7.88, 178/7.2, 178/DIG. 2, 313/92 LF, 350/96 B

[51] Int. Cl. ............................................ H04n 5/36

[58] Field of Search ............ 178/7.85, 7.88, DIG. 2, 178/7.2, DIG. 28, 7.86, 7.92; 346/74 CR, 110; 313/92 LF; 350/96 R, 96 B

[56] References Cited

UNITED STATES PATENTS

| | | | |
|---|---|---|---|
| 3,567,852 | 3/1971 | Ett | 178/7.85 |
| 3,533,278 | 10/1920 | Van Valkenburg | 346/110 R |
| 3,581,102 | 5/1971 | Nagao | 350/96 B |
| 3,321,657 | 5/1967 | Granitsas et al. | 346/74 CR |
| 3,564,128 | 2/1971 | Hosterman | 178/7.88 |
| 3,688,144 | 8/1972 | Harao et al. | 178/7.85 |
| 2,532,173 | 1/1951 | Szegho et al. | 178/6.8 |

*Primary Examiner*—Robert L. Griffin
*Assistant Examiner*—Joseph A. Orsino, Jr.
*Attorney*—Flynn & Frishauf

[57] ABSTRACT

A cathode ray tube device comprising a face plate having a picture transmission glass plate and a picture reception fiber plate, and a reflector disposed slantwise in front of the glass plate. In picture reception, the medium is traveling in front of the face plate. In picture reading or transmission, however, the graphic medium is traveling along the side of the face plate. These media are traveling in front and on the side of the face plate in their respective positions independent of each other.

5 Claims, 4 Drawing Figures

3784741
NO OR CLASSIF

CATHODE RAY TUBE DEVICE

BACKGROUND OF THE INVENTION

This invention relates to a cathode ray tube device and more particularly to a cathode ray tube device for both picture transmission and reception in a device.

One of the conventional cathode ray tubes has a face plate having a picture transmission or reading glass plate and a picture reception fiber plate. When this type of cathode ray tube is used, a picture is received and transmitted as follows. In picture reception, the photosensitive paper is traveling in close contact with the face plate and is photosensitized by the luminous flux on the phosphor screen inside the picture reception fiber plate emitting light by scanning the electron beam from the electron gun. In picture transmission, the printed matter is traveling separately from the front of the face plate and the luminous flux on the phosphor screen inside the picture transmission glass plate emitting light by scanning the electron beam, is focused on the graphic material by the optical lens and the reflected light from the graphic material is converted into electric signals by means of the photoelectric convertor.

There are, however, the serious disadvantages that it is necessary to replace the medium with another medium suitable for picture transmission or reception at each operating time and that such replacement requires dimensional accuracy and thus is difficult to accomplish in a compact device.

SUMMARY OF THE INVENTION

Accordingly, an object of this invention is to surmount these disadvantages and provide a cathode ray tube device in which the medium need not be interchanged each time picture transmission or reading is converted into picture reception and vice versa.

According to this invention, a reflector is disposed slantwise in front of the glass plate of the cathode ray tube having a picture transmission glass plate and a picture reception fiber plate; the picture reception medium, i.e. photosensitive paper, is traveling in close contact with the fiber plate; the picture reading or transmission medium, i.e. graphic material, is traveling along the side of the glass plate; the luminous flux on the phosphor screen inside the glass plate is reflected sideways by the reflector; and thus the medium need not be interchanged to convert from picture reception to reception and vice versa.

DETAILED DESCRIPTION OF THE INVENTION

Figures 1, 2, 3:
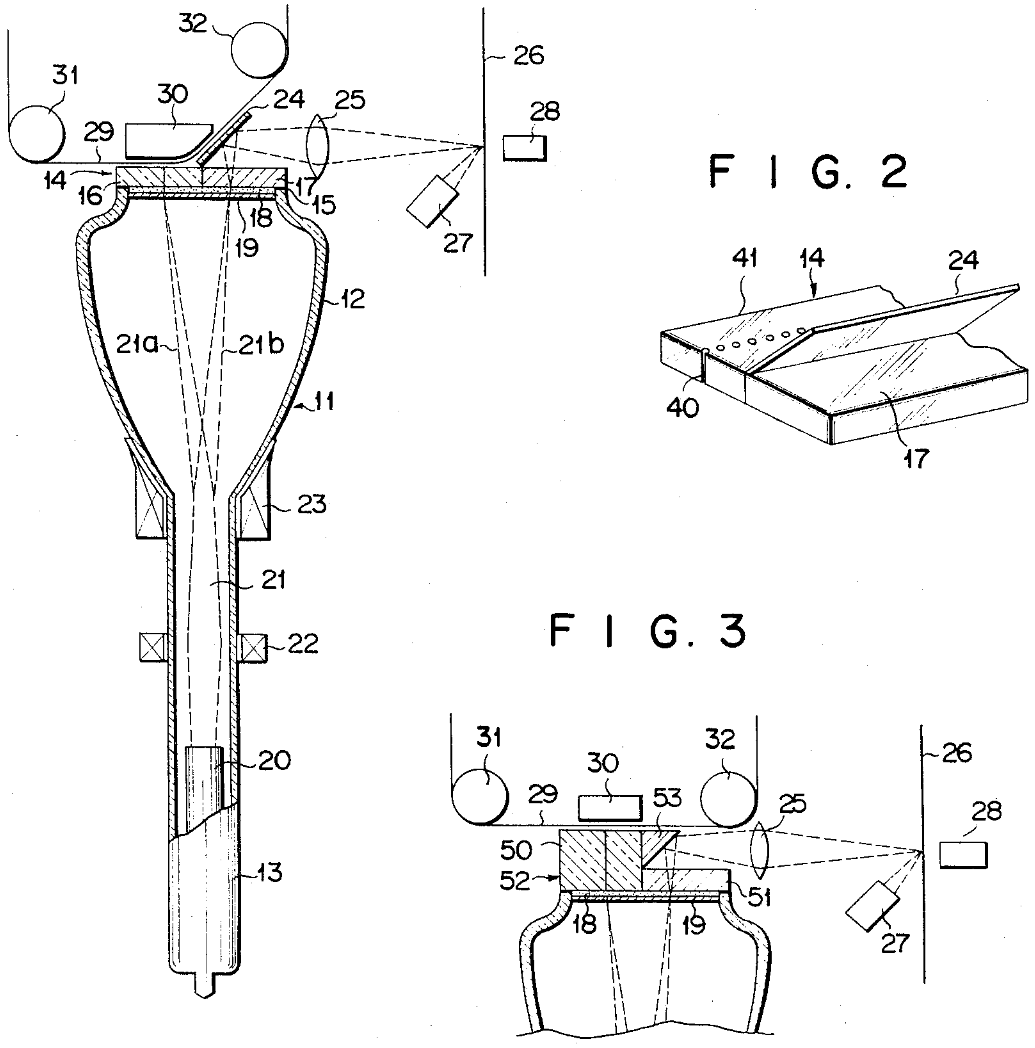
FIG. 1 is a sectional view of a cathode ray tube device as an embodiment of this invention.
FIG. 2 is a perspective view of a modification of the face plate of FIG. 1.
FIG. 3 is a sectional view of a cathode ray tube device as another embodiment of the invention.
Figure 4:
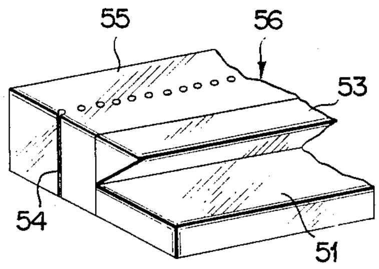
FIG. 4 is a perspective view of a modification of the face plate in the embodiment of FIG. 3.

In FIG. 1 is shown a funnel envelop 11 comprising a cone portion 12 and a neck portion 13. In front of the funnel envelope 11 is disposed a face plate 14. The face plate 14 includes a picture reception fiber plate 16 formed by arranging a great number of glass fibers of 25 or 6 microns in a predetermined direction and integrally securing them together, and a picture transmission glass plate 17 connected on the side of the fiber plate 16. Inside the face plate 14 is provided a phosphor screen 18 made of a phosphor suitable for picture transmission or reception. A metal-back 19 is disposed inside the phosphor screen 18. In the neck portion 13 is received an electron gun 20 for radiating the electron beam 21 toward the phosphor screen 18. On the outer periphery of the neck portion 13 forwardly of the electron gun 20 is located a focusing coil 22 for focusing the electron beam 21. On the outer periphery of the junction of the cone portion 12 and neck portion 13 is positioned a deflecting coil 23 for directing the focused electron beam to the fiber plate 16 or glass plate 17 and for deflecting the electron beam to unidimensionally scan the phosphor screen 18 inside the prescribed plate 16 or 17. A reflector 24 is disposed slantwise in front of the glass plate 17. On the side of the glass plate 17 is arranged an optical lens 25 for focusing the reflected light from the reflector 24. A graphic medium 26 is traveling on the side of the optical lens 25 and at the focusing point of the reflected light. Two photoelectric convertors 27 and 28 are respectively disposed inside and outside the graphic medium 26. In front of the fiber plate 16 is shown a scanning means having a head pad 30 and guide rollers 31 and 32 in such a manner that the photosensitive paper 29 can be traveling in close contact with the fiber plate 16.

Referring now to the drawings, the operation of the cathode ray tube device will be described. In picture reception, the photosensitive paper 29, i.e. recording paper, is traveling in close contact with the fiber plate 16. From the electron gun 20 is radiated the electron beam 21 having current density corresponding to the received signal. After the electron beam 21 has been focused by the focus coil 22 the beam is deflected by the deflecting coil 23 to be directed to the picture reception fiber plate 16 and to unidimensionally scan the phosphor screen inside the fiber plate 16. The phosphor screen 18 emits light when the screen 18 is scanned by the electron beam 21a. The resultant luminous flux photosensitizes the photosensitive paper 29 through the fiber plate 16, thereby producing the desired image on the photosensitive paper 29.

Referring now to the drawings, the picture transmission process will be described. The graphic material or printed matter 26 is traveling on the side of the face plate 14. The electron beam 21 of a predetermined current density is radiated from the electron gun 20. After the electron beam 21 has been focused by the focusing coil 22, it is deflected by the deflecting coil 23 to direct it to the glass plate 17 and to unidimensionally scan the phosphor screen inside the glass plate 17. The luminous flux on the phosphor screen 18 emitting light by scanning the electron beam 21b passes through the glass plate 17 and is reflected sideways by the reflector 24. The reflected light is focused on the printed matter 26 by the optical lens 25. The light focused on the printed matter is reflected in a quantity of light according to the contrast of the printed matter 26. The reflected light is converted into electric signals by photoelectric convertor 27 inside the printed matter 26. When the printed matter 26 is printed on a transparent matter, the focused light passes through the printed matter according to the contrast of the printed matter. The light passing through the medium is converted into electric signals by a photoelectric convertor outside the printed matter. As the luminous flux on the phosphor screen 18 inside the picture transmission glass plate 17 is reflected sideways by the reflector 24, the reading out of the printed matter 26 may be performed without removing the photosensitive paper 29 traveling in close contact with the fiber plate 16.

The face plate 14 in the above embodiment may be constructed of a glass plate 17 and an electrostatic recording plate 41 formed by implanting needle conductors 40 in the insulating plate with equal spacings, as shown in FIG. 2. Note that the phosphor screen inside the electrostatic recording plate 41 is no longer needed.

Referring now to the drawings, another embodiment of the invention will be described. Since this embodiment has the same construction as the previous one, except for the face plate side, the description thereof is omitted here.

As shown in FIG. 3, a fiber plate 50 made of a large number of glass fibers is thicker than a picture transmission glass plate 51. A face plate 52 is constructed by connecting the glass plate 51 to the side of the fiber plate 50 with a step. To the stepped side of the fiber plate 50 is coupled a reflector 53 having the general shape of a rectangular prism with its slant face as a reflecting surface so as to be on the same plane as the fiber plate 50. In front of the face plate 52 is disposed a device for the recording paper, i.e. photosensitive paper 29, so as to cause the paper to be traveling in close contact with the fiber plate 50. This device is provided with two guide rollers 31 and 32 and a head pad 30.

A picture transmission device is disposed on the side of the face plate 52. This device contains the optical lens 25 for focusing on the printed matter the light reflected from reflector 53 and photoelectric convertors 27 and 28 for converting into electric signals the reflected or transmitting light with an intensity according to the contrast of the printed matter.

A good picture transmission can be accomplished by fixing the reflector 53 to the fiber plate 50 of the face plate 52 without changing the position of the reflector 53 when the device is displaced.

The fiber plate in this embodiment may be replaced by an electrostatic recording plate 55 formed by inplanting needle conductors 54 in the insulating plate with equal spacings.

In these embodiments, two distinctive electron guns for picture transmission and reception respectively may also be disposed in the neck portion of the tube so as to radiate two different electron beams. With such a construction, simultaneous picture transmission and reception becomes possible.

What we claim is:

1. A cathode ray tube device for recording and reading information comprising:
   - a funnel-shaped envelope including a neck portion coupled to a cone portion;
   - a faceplate disposed on the front end of said envelope and comprising a fiber glass plate for recording and a clear glass plate for reading juxtaposed thereto, said fiber glass plate being formed of a number of glass fibers densely arranged in the axial direction of the cathode ray tube and having a surface adapted to contact with a photosensitive medium for recording;
   - a phosphor screen disposed inside said faceplate;
   - an electron gun unit received in said neck portion for emitting an electron beam toward said phosphor screen; and
   - a reflector having a reflecting surface disposed slantwise in front of said clear glass plate for reflecting light from said screen to a medium to be read.

2. The cathode ray tube device according to claim 1 which further comprises a head pad for contacting the photosensitive medium to said glass fiber plate and a lens system for focusing the reflected light from said reflector onto said medium to be read.

3. The cathode ray tube device according to claim 1 wherein said medium to be read is located adjacent said face plate.

4. The cathode ray tube device according to claim 1 wherein said faceplate is comprised of a thick glass fiber plate and a thin clear glass plate so connected to the side of said thick glass fiber plate that the outer surface of said clear glass plate is in a retracted position from the outer surface of said glass fiber plate, said reflector being a rectangular prism coupled to the side of said glass fiber plate to which said glass plate is connected.

5. The cathode ray tube device according to claim 4 wherein the outer surface of said rectangular prism is in substantially the same plane as the outer surface of said glass fiber plate.

* * * * *